April 4, 1967

G. A. COPRON 3,312,461

VISE

Filed Oct. 16, 1964

INVENTOR.
GLENN A. COPRON
BY
Wilson, Settle & Craig
ATTORNEYS

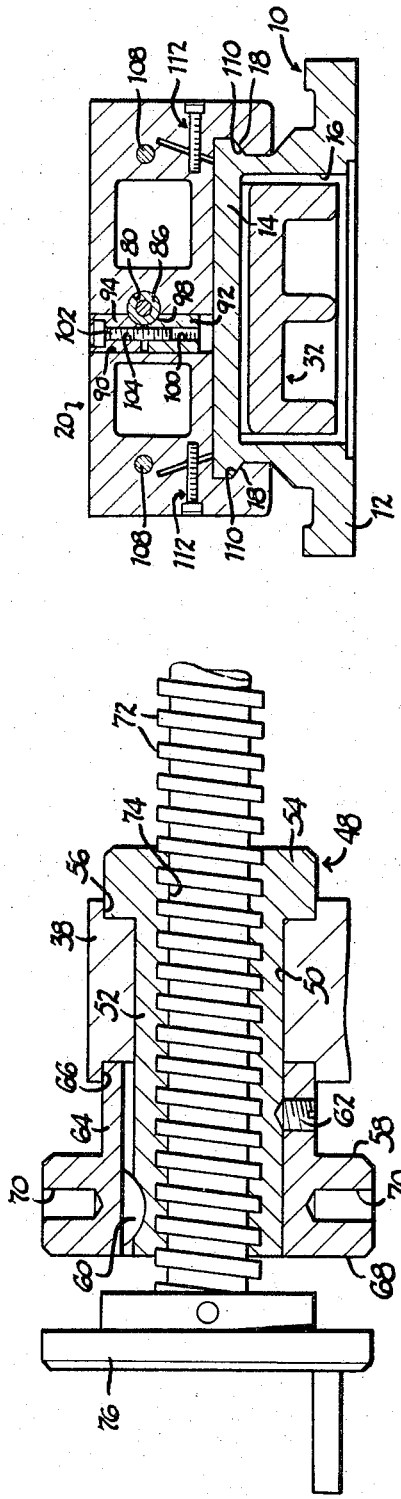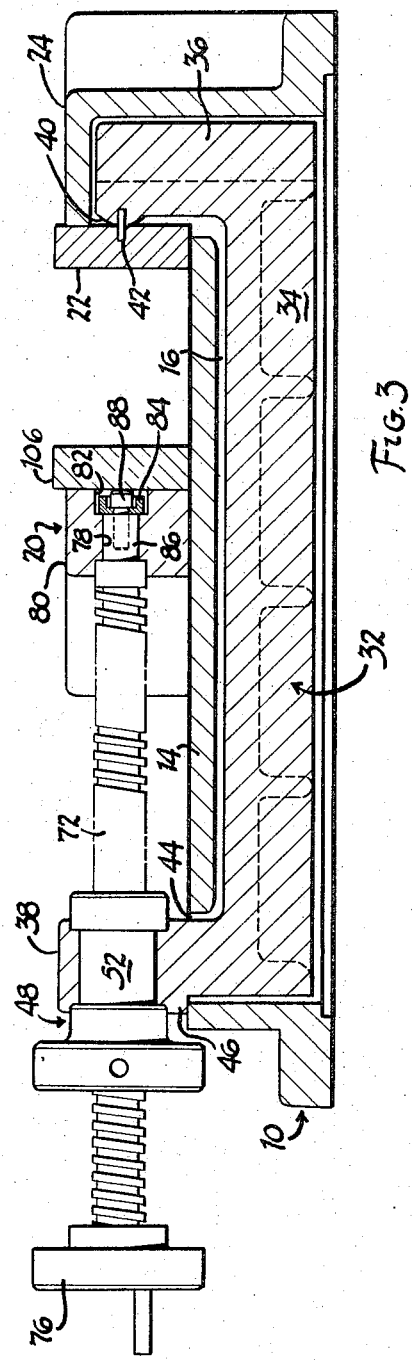

United States Patent Office 3,312,461
Patented Apr. 4, 1967

3,312,461
VISE
Glenn A. Copron, 436 E. 14-Mile Road,
Madison Heights, Mich. 48071
Filed Oct. 16, 1964, Ser. No. 404,279
8 Claims. (Cl. 269—101)

This invention relates to work holders of the type generally referred to as machine-tool vises, and more particularly to an improved form of work holder of this type particularly adapted for precision work.

In conventional work holders of the general type with which the present invention is conceived, the holder generally includes a frame having a stationary jaw mounted on the frame and a movable jaw driven along the frame by a clamping screw to clamp the work piece between the fixed and movable jaws. The holder frame is constructed with mounting lugs or ears by means of which the work holder can be clamped in an adjusted position upon the work table or bed of a machine tool to hold the work piece at the desired position relative to the path of the tool. The work holder is positioned upon a bed or table of the machine by accurately locating its fixed jaw relative to the tool path and then clamping the work holder to the machine bed. The fixed jaw thus serves as a reference for locating the work piece with respect to the tool path.

The precision or accuracy with which successive parts are machined is thus directly dependent upon the degree of precision with which the work holder is located upon the machine. Uniformity between successively machined parts is likewise directly dependent upon the degree of precision with which the work holder maintains its originally adjusted position upon the machine bed. Presently available work holders possess characteristics which make it difficult for them to accurately maintain their initially adjusted positions on the machine over a number of successive machine operations Conventionally, the stationary jaw of a work holder is located near one end of the work holder while the nut through which the clamping screw is threaded is spaced a substantial distance from the fixed jaw in order to provide a reasonably wide range of jaw openings. The clamping force exerted by the work holder upon a work piece thus reacts against the work holder frame at the opposite ends of the frame in a manner tending to stretch or distort the frame. To firmly hold the work holder in position upon the machine bed, the conventional practice is to clamp the work holder frame to the machine frame at several spaced locations on the work holder. The reaction of the clamping forces upon the work holder frame frequently exerts sufficient forces to slightly distort the frame, thus setting up forces tending to shift various clamping points between the work holder and frame relative to each other. While the displacements occasioned by frame distortion are minute, they are sufficient to be objectionable. In addition to the clamping force reaction on the work holder frame, frequently the machine operator will hammer the clamping screw crank to firmly clamp the work piece, thus frictionally seating the clamping screw threads within the nut so tightly that it is necessary to hammer the clamping screw crank again to unclamp the parts. In the conventional work holder, the clamping screw nut is mounted directly upon the frame and this hammering action again tends to disturb the adjusted position of the work holder on the machine.

One object of the present invention is to provide a work holder wherein the clamping force reactions are isolated from the work holder frame.

It is another object of the invention to provide a work holder wherein clamping force reactions are absorbed by a load-carrying member which is supported substantially independently from the frame structure which mounts the work holder upon a machine.

It is another object of the invention to provide a work holder wherein a clamping screw may be selectively locked or unlocked against rotation relative to the movable jaw.

The foregoing, and other objects, are achieved in a work holder in which the frame takes the form of a hollow housing which is mounted upon a machine in the conventional manner. A movable jaw is mounted upon the housing for sliding movement toward and away from a fixed jaw plate which is fixedly mounted upon the housing. An elongate load member is constructed with upstanding projections at each end and is loosely supported in the housing. One of the projections is located in bearing engagement against the back of the fixed jaw plate, while the other projection on the load member rotatably supports a nut assembly in which the clamping screw of the work holder is threadably received. The nut assembly is maintained against axial movement relative to the load member so that clamping force reactions against the movable jaw are transmitted by the clamping screw to the nut and thence directly to the load member.

Since the two jaws are located between the respective projections of the load members, the reactive forces against the movable jaw are transmitted to the load member in a direction urging the projection at its opposite end more firmly against the fixed jaw. Clamping force reactions against the fixed jaw plate are transmitted through the plate in compression and are applied to the abutting portion of the load member projection.

Other objects and features of the invention will become apparent by reference to the following specification and to the drawings.

In the drawings:

FIGURE 3 is a cross-sectional view of the work holder taken on line 3—3 of FIGURE 2;

FIGURE 4 is an enlarged detailed cross-sectional view of the clamping screw-nut structure; and FIGURE 5 is a transverse cross-sectional view of the work holder taken on line 5—5 of FIGURE 2.

Figure 1:
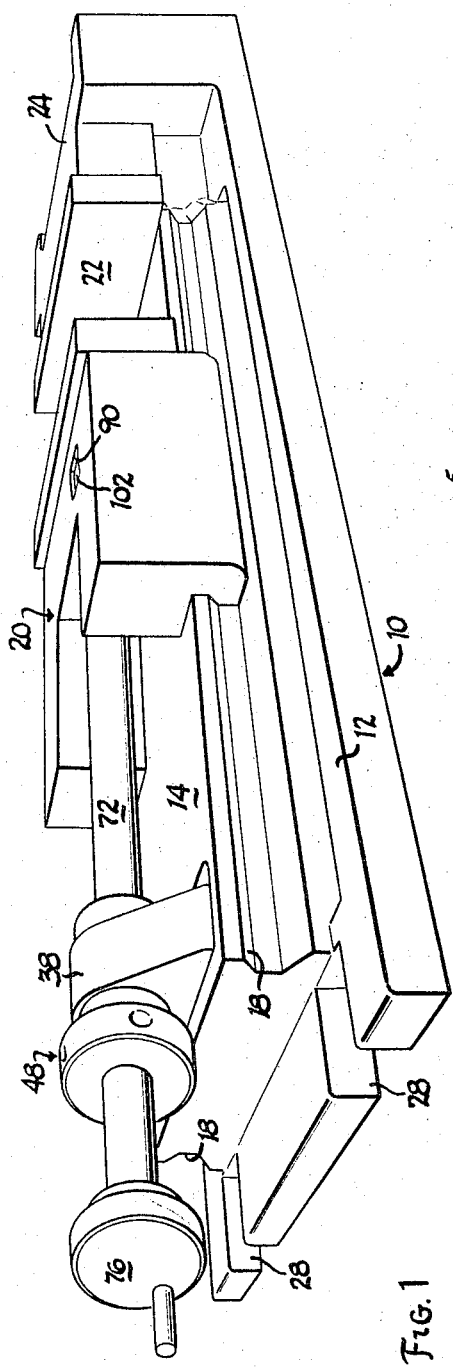
FIGURE 1 is a perspective view of a work holder embodying the present invention.
Figure 2:
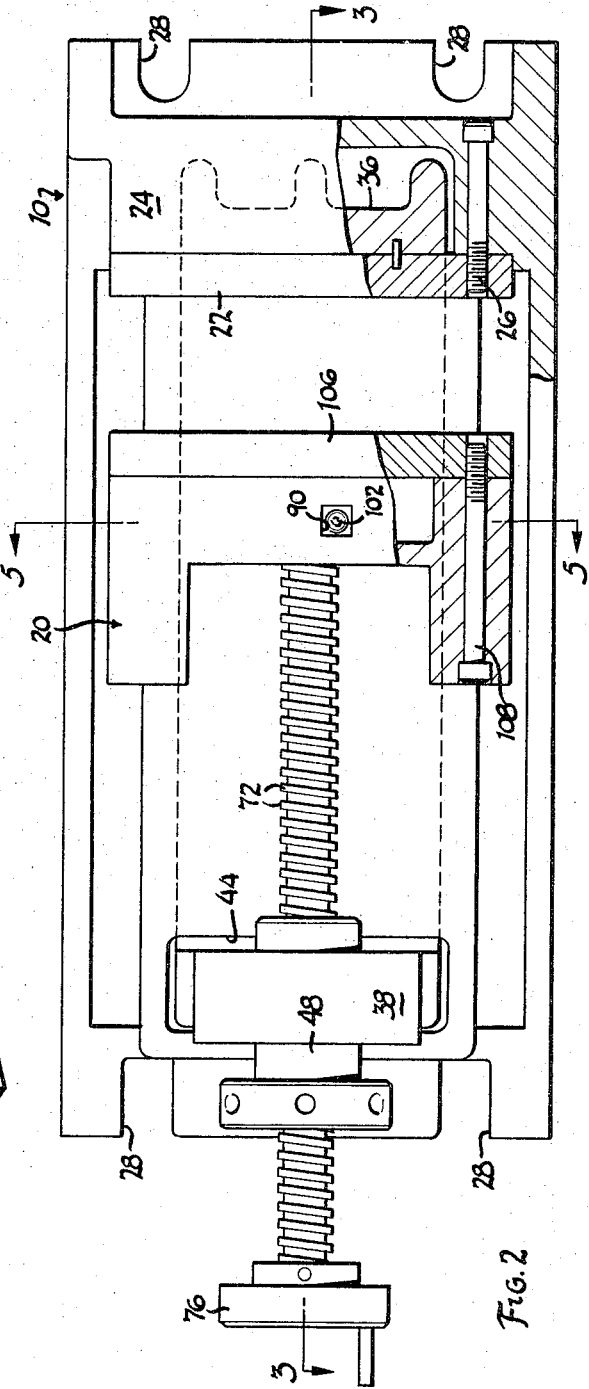
FIGURE 2 is the top plan view with certain parts broken away or shown in section.

The work holder disclosed in the drawings includes an elongate hollow housing designated generally 10 which is formed with a flat bottomed base 12 and an upraised central body portion 14 which, as best seen in the transverse cross-sectional views of FIGURES 3 and 5 is hollowed out in its interior as at 16. Extending longitudinally along the opposite sides of body portion 14 are jaw guiding ways 18 adapted to slidably receive and guide a movable jaw assembly designated generally at 20 toward and away from a fixed or stationary jaw plate 22. Jaw plate 22 is fixedly mounted on an upstanding projection 24 formed as an integral part of housing 10 at one end of the housing as best seen in FIGURES 2 and 3. Projection 24 is hollow and is open at its forward or left-hand side as viewed in FIGURES 2 and 3, the opening being closed by fixed jaw plate 22 which is secured in position as by bolts 26.

Base 12 of housing 10 is provided with a series of recesses such as 28 which can receive bolts for clamping housing 10 at the desired position upon a work table. Because housing 10 is not required to transmit or absorb any of the forces exerted in clamping an object or work piece between movable jaw 20 and fixed jaw 22, the initial location of the work holder upon the work table is not disturbed by clamping and unclamping objects in the work holder. The clamping force necessary to firmly grip the object is transmitted from stationary jaw plate 22 to movable jaw assembly 20 by a load transmitting member designated generally 32 (see FIGURES 2 and 5 particularly) which is loosely supported within housing in a manner such that none of the clamping forces or distortion of member 32 caused by the application of clamping forces are transmited to housing 10.

The structure of load-carrying member 32 is best seen in FIGURE 3. Member 32 includes an elongate body portion 34 which is formed with upstanding projections 36 and 38 at each end of body 34. Projection 36 extends from body 34 upwardly into the hollow interior of projection 24 on housing 10 and is formed at its upper end with a transversely extending bump or protuberance 40 which is disposed in bearing engagement with the back of stationary jaw 22. One or more pins 42 are received in opposed bores on jaw blade 22 and bump 40. The sole function of pins 42 is to prevent the right-hand end of member 32 from falling downwardly through the open bottom of housing 10 when the work holder is being carried from place to place. Many other arrangements for performing these same purposes could equally well be employed, however, it will be noted that the illustrated pin arrangement is desirable from the standpoint of minimizing possible points of contact between load member 32 and the stationary support structure defined by housing 10. The rounded protuberance or bump 40 is employed in preference to a flat face-to-face contact because the substantial line contact between jaw 28 and bump 40 minimizes the area of force transmission between load-carrying member 32 and the support structure.

At the opposite end of load member 32, projection 38 extends upwardly from main body 34 through an opening 44 formed in the upper wall of housing body 14. Opening 44 is larger than the cross-sectional area of projection 38 so that, in the assembled condition, projection 38 does not contact the side walls of the opening. A ledge 46 on projection 38 extends rearwardly beyond opening 44 to rest on the upper surface of the housing to retain the left-hand end of member 32 against falling downwardly from the housing.

Referring now to FIGURE 4, a nut assembly designated generally 48 is rotatable received within a bore 50 which extends through the upper portion of projection 38. Nut assembly 48 includes an elongate sleeve 52 which is rotatably received within bore 50. An integral radially enlarged head 54 is formed at one end of sleeve 52 and is rotatably received within a relatively shallow counter bore 56 in projection 38. Head 54 thus positively retains sleeve 52 against axial movement to the left from the FIGURE 4 position.

At the opposite side of projection 38, collar 58 is mounted upon sleeve 52 and rotatively locked to sleeve 52 as by a Woodruff key. A set screw 62 is employed to lock collar 58 against axial movement relative to the sleeve. Collar 58 is formed with a reduced diameter section 64 which is rotatably seated in a second counter bore 66 in projection 38. An enlarged diameter portion 68 of collar 58 is formed with a plurality of radially extending bores such as 70 into which a rod may be inserted to achieve greater leverage in rotating nut assembly 48 during the work holder clamping operation.

A clamping screw 72 is threadably received within an internally threaded bore 74 extending through sleeve 52 of nut assembly 48. A hand-crank 76 is fixedly mounted on one end of clamping screw 72 for rapidly rotating screw 72 under no load conditions of the work holder. The primary function of crank 76 is for convenience in rapidly shifting jaw assembly 20.

Referring now particularly to FIGURES 3 and 5, the opposite end of clamping screw 72 is coupled to movable jaw assembly 20. A bore 78 extends through the central portion of the main body 80 of jaw assembly 20. A counter bore 82 extends inwardly from the jaw face side of body 80 and within counter bore 82, a washer-like bearing 84 is loosely secured to the reduced diameter end portion 86 of screw 72 as by a bolt 88. The coupling defined by bolt 88 and washer 84 acts to secure jaw assembly 20 against any substantial axial movement relative to screw 72 while at the same time permitting relative rotation of screw 72 within bore 78.

Normally, screw 72 is locked against rotation within bore 78 by a clamping arrangement shown in FIGURE 5. A hole of rectangular cross-sectional configuration 90 extends downwardly through main body portion 80 of the movable jaw assembly. Within hole 90. a pair of clamping blocks 92 and 94 are mounted for sliding movement. As seen in FIGURE 5, hole 90 intersects bore 80 and the appropriate corners of blocks 92 and 94 are recessed as at 96 and 98 to form a cylindrical surface on each block complementary in shape to the outside diameter of portion 86 of screw 72. Lower block 92 is provided with a threaded bore 100 which threadably receives the lower end of a clamping bolt 102 which is freely rotatable within a bore 104 in upper clamping block 94. As the bolt 102 is tightened it draws the two clamping blocks together and this action forces shaft extension 86 of clamping screw 72 to the right as viewed in FIGURE 5 to frictionally clamp the screw against rotation within bore 80.

Movable jaw assembly 20 also includes a removable jaw plate 106 which is detachably secured to the main body 80 of movable jaw 20 by any suitable means, such as bolts 108 indicated in cross section in FIGURE 5. Main body 80 of movable jaw 20 is formed with complementary surface 110 which slidably mount the movable jaw assembly upon ways 18 of housing 10. Loose play between the ways and movable jaw 20 can be adjusted as by the slot and screw arrangement designated generally 112 in FIGURE 5.

In normal operation, the work holder is operated with clamping screw 72 clamped against rotation relative to movable jaw assembly 20 by the clamping block arrangement described above. To shift movable jaw assembly 20 into and out of clamping engagement with a part or work piece located between the fixed and movable jaws, a rod is inserted in a radial bore 70 of nut assembly 48 and the nut assembly is rotated, rotation of the nut in the appropriate direction advancing or retracting movable jaw assembly 20 toward or away from fixed jaw plate 22.

In the normal clamping or unclamping of parts in the work holder, movable jaw assembly 20 is not required to move any great distance and the normal operating range of the movable jaw can be accomplished by rotating nut 48 less than one revolution. In the event it is desired to change the adjustment by moving jaw 20 a substantial distance, as in initially setting up the work holder, clamping blocks 92 and 94 are loosened by loosening screw 102, to permit clamping screw 72 to be rotated relative to movable jaw assembly 20. Nut assembly 48 is held stationary and crank assembly 76 is rapidly rotated to shift movable jaw assembly to the desired position. Clamping blocks 92 and 94 are then tightened to again lock the clamping screw against rotation relative to the movable jaw and further movement of the movable jaw is accomplished by rotating nut assembly 48.

Referring to the cross-sectional views of FIGURES 3 and 5, it will be noted that when a part is clamped between the jaws of the work holder, the clamping force applied as a reaction between the work piece and fixed jaw 22 is transmitted through the jaw plate to projection 36 of load-carrying member 32. Likewise, clamping force exerted in reaction against movable jaw assembly 20 is transmitted via clamping screw 72 and nut 48 to projection 38 of load member 32. Exertion of a clamping force urging the two jaws toward each other is absorbed entirely within member 32 in that the clamping forces are applied to the projections 36 and 38 at the opposite ends of the load member in a fashion tending to separate the projections from each other. This action places main body portion 34 of load member 32 in tension, this tension force urging protuberance 40 on projection 36 more firmly into bearing engagement with the back of stationary jaw plate 22. The clamping forces are thus adsorbed entirely within load-carrying member 32 since this member does not contact housing 10. Thus, a substantial clamping force can be applied without any danger of distorting the housing and thus tending to disturb the adjusted position of the work holder relative to the path of a tool of a machine upon which the work holder is mounted.

While one embodiment of the invention has been described in detail, it will be apparent to those skilled in the art that the disclosed embodiment may be modified. Therefore, the foregoing description is to be considered exemplary rather than limiting and true scope of the invention is that defined in the following claims.

I claim:
1. In combination with a work holder having a frame, means on said frame for mounting said work holder upon a support, a stationary jaw fixedly mounted on said frame, a movable jaw mounted on said frame for movement toward and away from said fixed jaw, and clamping screw means for moving said movable jaw toward or away from said fixed jaw to clampingly grip or release a work piece located between the jaws; means for isolating clamping forces applied to the jaws from said frame comprising an elongate load member loosely supported in said frame, means at one end of said load member operatively mounting said clamping screw means upon said load member to transmit clamping force reactions applied to said movable jaw to said load member, and abutment means at the opposite end of said load member disposed in abutting engagement with the side of said stationary jaw remote from said movable jaw.

2. In a work holder combination as defined in claim 1; the further improvement wherein said clamping screw means comprises nut means mounted in said means at said one end of said load member for rotation relative to said load member, a clamping screw threadably mounted in said nut means, and means coupling one end of said clamping screw means to said movable jaw.

3. In the work holder combination defined in claim 2; the further improvement wherein said means coupling said clamping screw to said movable jaw comprises first means retaining said clamping screw against axial movement relative to said movable jaw, and second means for selectively locking said clamping screw means against rotation relative to said movable jaw.

4. In a work holder having a frame, means on said frame for mounting said work holder upon a support, a stationary jaw fixedly mounted on said frame, a movable jaw mounted on said frame for movement toward and away from said fixed jaw, and clamping screw means coupled to said movable jaw for moving said movable jaw toward or away from said fixed jaw to selectively clamp or release a work piece between said jaws; means for isolating clamping forces applied to said jaws from said frame comprising an elongate load member having an upstanding projection at each end thereof, said load member being located relative to said frame with said jaws disposed between said projections on said load member, means on one of said projections operatively mounting said clamping screw means therein, and abutment means on the other of said projections engaged with the side of said stationary jaw remote from said movable jaw, whereby the clamping force reactions exerted on the jaws are transmitted directly to said load member, said load member being loosely supported in said frame to accommodate distortion of said load member induced by the application of clamping force reactions to said member.

5. A work holder comprising an elongate housing having means thereon for mounting said housing upon a support, a transversely extending fixed jaw plate at one end of said housing, an elongate load-carrying member, a first projection at one end of said load member projecting upwardly from said load member and having its upper end disposed in bearing engagement with the back of said fixed jaw plate, a second projection at the opposite end of said load member, a clamping screw extending longitudinally of said housing, nut means mounted in said second projection on said load member threadably receiving said clamping screw for shifting said screw longitudinally of said housing upon relative rotation between said screw and said nut means, means on said housing defining longitudinally extending jaw guiding ways, and movable jaw means slidably mounted upon said ways and operatively coupled to said clamping screw for movement toward and away from said fixed jaw plate on relative rotation between said screw and said nut means.

6. A work holder comprising an elongate hollow housing having means thereon for mounting said housing upon a support, a integral hollow upstanding projection at one end of said housing having a transversely extending fixed jaw plate thereon facing the other end of said housing, means defining an opening through the upper side of said housing adjacent to said other end of said housing, an elongate load-carrying member loosely received within said housing, a first projection at one end of said load member projecting from said load member upwardly into said hollow projection of said housing and having its upper end in load receiving engagement behind said fixed jaw plate, a second projection at the opposite end of said load member projecting upwardly from said load member loosely through said opening in said housing, a clamping screw extending longitudinally of said housing, nut means mounted in said second projection on said load member threadably receiving said clamping screw for shifting said screw longitudinally of said housing upon relative rotation between said screw and said nut means, means on said housing defining longitudinally extending jaw guiding ways, and movable jaw means slidably mounted upon said ways and operatively coupled to said clamping screw for movement toward and away from said fixed jaw plate on relative rotation between said screw and said nut means.

7. A work holder as defined in claim 6 wherein said nut means comprises a nut sleeve mounted in said projection for rotation therein in fixed axial relationship to said housing, and means for selectively locking said clamping screw against rotation relative to said movable jaw means.

8. A work holder comprising an elongate hollow housing having means thereon for mounting said housing upon a support, an integral hollow upstanding projection at one end of said housing having a transversely extending fixed jaw plate thereon facing the other end of said housing, means defining an opening through the upper side of said housing adjacent to said other end of said housing, an elongate load-carrying member loosely received within said housing, a first upward projection at one end of said load member projecting from said load member upwardly into said hollow projection and having its upper end disposed in bearing engagement behind said fixed jaw plate, a second projection at the opposite end of said load member projecting upwardly from said load member loosely through said opening in said housing, a clamping screw extending longitudinally of said housing, nut means rotatably mounted in said second projection on said load member threadably receiving said clamping screw for shifting said screw longitudinally of said housing upon relative rotation between said screw and said nut means, means on said housing defining longitudinally extending jaw guiding ways, moveable jaw means slidably mounted upon said ways and having a bore therein receiving one end of said clamping screw, means maintaining said clamping screw against axial displacement relative to said movable jaw means, and clamp means mounted in said movable jaw means for locking said screw against rotation in said bore.

References Cited by the Examiner

UNITED STATES PATENTS

| | | | |
|---|---|---|---|
| 713,189 | 11/1902 | Yates | 269—250 |
| 2,854,875 | 10/1958 | Patrick | 269—285 X |
| 3,232,602 | 2/1966 | Bernhard | 269—250 X |

WILLIAM W. DYER, JR., *Primary Examiner.*

W. D. BRAY, *Assistant Examiner.*